US008967990B2

(12) United States Patent
Weidinger et al.

(10) Patent No.: US 8,967,990 B2
(45) Date of Patent: Mar. 3, 2015

(54) DEVICE AND METHOD FOR A LAYERWISE MANUFACTURING OF A 3-DIMENSIONAL OBJECT FROM A BUILDING MATERIAL IN POWDER FORM

(71) Applicant: EOS GmbH Electro Optical Systems, Krailing (DE)

(72) Inventors: Jochen Weidinger, Munich (DE); Frank Muller, Munich (DE); Florian Pfefferkorn, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 14/150,993

(22) Filed: Jan. 9, 2014

(65) Prior Publication Data

US 2014/0127339 A1 May 8, 2014

Related U.S. Application Data

(60) Division of application No. 13/027,001, filed on Feb. 14, 2011, now Pat. No. 8,658,078, which is a continuation of application No. 11/994,285, filed on May 20, 2008.

(30) Foreign Application Priority Data

May 18, 2006 (DE) .......................... 10 2006 023 484

(51) Int. Cl.
    *B29C 67/00* (2006.01)
(52) U.S. Cl.
    CPC .................................. *B29C 67/0077* (2013.01)

USPC ........ 425/174.4; 425/174; 264/497; 264/494; 264/401; 264/113

(58) Field of Classification Search
    CPC ............ B29C 67/0074; B29C 67/0077; B29C 67/0081; B29C 67/0085; B29C 67/0096
    USPC ........ 425/174, 174.4; 264/497, 494, 401, 113
    See application file for complete search history.

(56) References Cited

U.S. PATENT DOCUMENTS

| 5,730,925 | A  | * | 3/1998 | Mattes et al. ............... 425/174.4 |
| 6,340,297 | B1 | * | 1/2002 | Chapman et al. .......... 425/174.4 |
| 6,531,086 | B1 | * | 3/2003 | Larsson ...................... 425/174.4 |
| 6,733,267 | B2 | * | 5/2004 | Chapman et al. .......... 425/174.4 |
| 7,048,530 | B2 | * | 5/2006 | Gaillard et al. ............... 425/258 |
| 2004/0173946 | A1 | * | 9/2004 | Pfeifer et al. ................. 264/497 |

* cited by examiner

Primary Examiner — Timothy Kennedy
(74) Attorney, Agent, or Firm — Seyfarth Shaw LLP

(57) ABSTRACT

A method is provided, by which a three-dimensional object is manufactured by a subsequent solidification of layers of a building material in powder form at the positions in the respective layer that corresponds to the cross-section of the object by means of the action of a laser or another energy source,
wherein as building material in powder form a material is used which contains the old powder that has remained as unsolidified powder in the manufacturing of one or more previously formed objects and a proportion of new powder that has not been used before in any manufacturing process,
characterized in that
the building material in powder form is mechanically consolidated when a layer is applied.

7 Claims, 4 Drawing Sheets

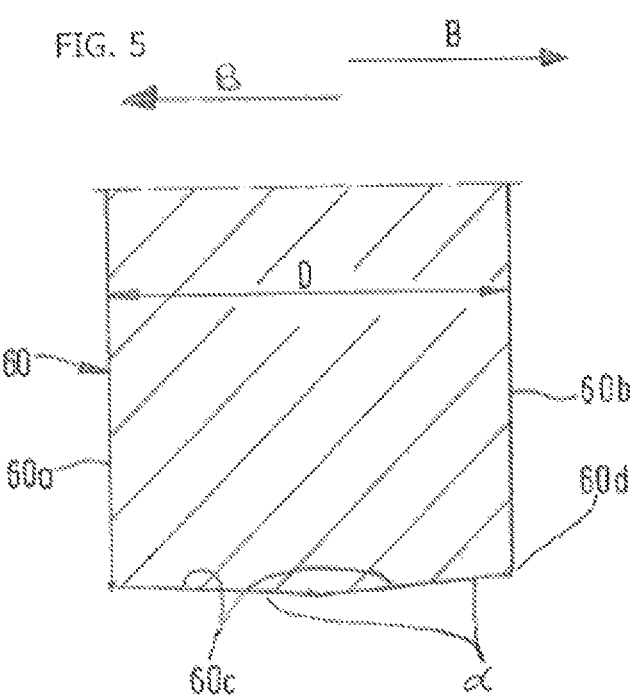

DEVICE AND METHOD FOR A LAYERWISE MANUFACTURING OF A 3-DIMENSIONAL OBJECT FROM A BUILDING MATERIAL IN POWDER FORM

This application is a divisional of U.S. patent application Ser. No. 13/027,001, filed Feb. 14, 2011, which in turn is a continuation of U.S. patent application Ser. No. 11/994,285, filed on May 27, 2008, which is a national stage entry of PCT/EP2007/003641, filed Apr. 25, 2007, and claims priority to DE 102006023484.7, filed May 18, 2006, the contents of which are herein incorporated by reference in their entirety.

The invention is related to a device and a method for a layer-wise manufacturing of a three-dimensional object from a building material in powder form. In particular, the invention is related to a method for selective laser sintering, in the following briefly called laser sintering method, and to a laser sintering device.

A laser sintering method and a laser sintering device, are, for example, known from DE 101 05 404 A1. In the method particularly a plastic powder such as polyamide is used.

In the known method for each building process a specified amount of old powder, i.e. powder, which remains from one or several previous building processes, is used. However, the old powder is subject to an aging process.

For example the old powder is thermally and/or thermooxidatively damaged and thus has other material properties and for this reason also other processing parameters than new powder. Therefore, it can be added to the new powder only in defined proportions in order not to put at risk the building process and the part quality. The so-called refresh rate is the value of the percentage of new powder in the mixed amount/percentage of old powder in the mixed amount (e.g. 50/50) that is used for a building process. This refresh rate shall be as small as possible, because then the costs for new powder can be saved.

In DE 101 05 504 A1 it is proposed to preprocess the old powder or a mixture of old powder and new powder before the solidification, for example by fluidizing, in order to reduce the effect of aging-related quality-reducing changes such that more old powder can be added.

By such a pre-treatment, however, usually not all aging-related quality-reducing changes of the powder can be eliminated. In particular, a too high proportion of old powder gives rise to an unsatisfactory surface quality of the outer walls of the part due to dip positions, which are also called "sink marks" or "orange peel".

From WO 2005/097475 a laser sintering method and a laser sintering powder for such a method are known, wherein it is attempted to solve the problem of the dip positions by using a certain material that has an increased stability in the laser sintering process and thus has fewer aging-related damages, when it is used as old powder. However, in that case the user is dependent on the use of this specific powder which in turn has different properties than the familiar powder used up to that time and possibly does not meet all demands.

Furthermore, from U.S. Pat. No. 4,938,816 it is known to compact the powder in laser sintering by generating an electromagnetic field during or before the solidification with the laser.

From EP 1 058 675 B1 it is known to compact an applied powder layer by means of a roller in the layer sintering of a ceramics powder. Thereby the time shall be reduced, which is required in the sintering in the solid phase of the ceramics powder.

From DE 195 14 740 C1 a device for laser sintering, in particular of metal powder, is known, in which the powder is applied by means of an application blade. The blade has at the application edge a beveled edge having an angle between 30° and 90°. A beveled face, which has an angle between 1° and 60° is also provided at the opposing smoothing edge. The smoothing edge smoothes an already solidified layer.

It is an object of the invention to provide a method and a device for producing a three-dimensional object, in particular a laser sintering method and a laser sintering device, by which the refresh rate can be reduced and by which the costs of the process can be reduced.

The method has the advantage that conventional powder for laser sintering such as polyamide or other families, in particular polyaryletheretherketone (PEEK), in each case with and without additions such as glass particles, reinforcing fibers, metallic additions as e.g. aluminum-filled polyamide and others, can be used, the properties of which are sufficiently known. Furthermore, by the method and the device the refresh rate can be reduced up to 0% new powder (0/100).

Further features and utilities of the invention arise from the description of embodiments based on the figures, of which:

FIG. 5 shows a schematic perspective side view of a powder application blade having symmetric application surfaces.

Figure 1:
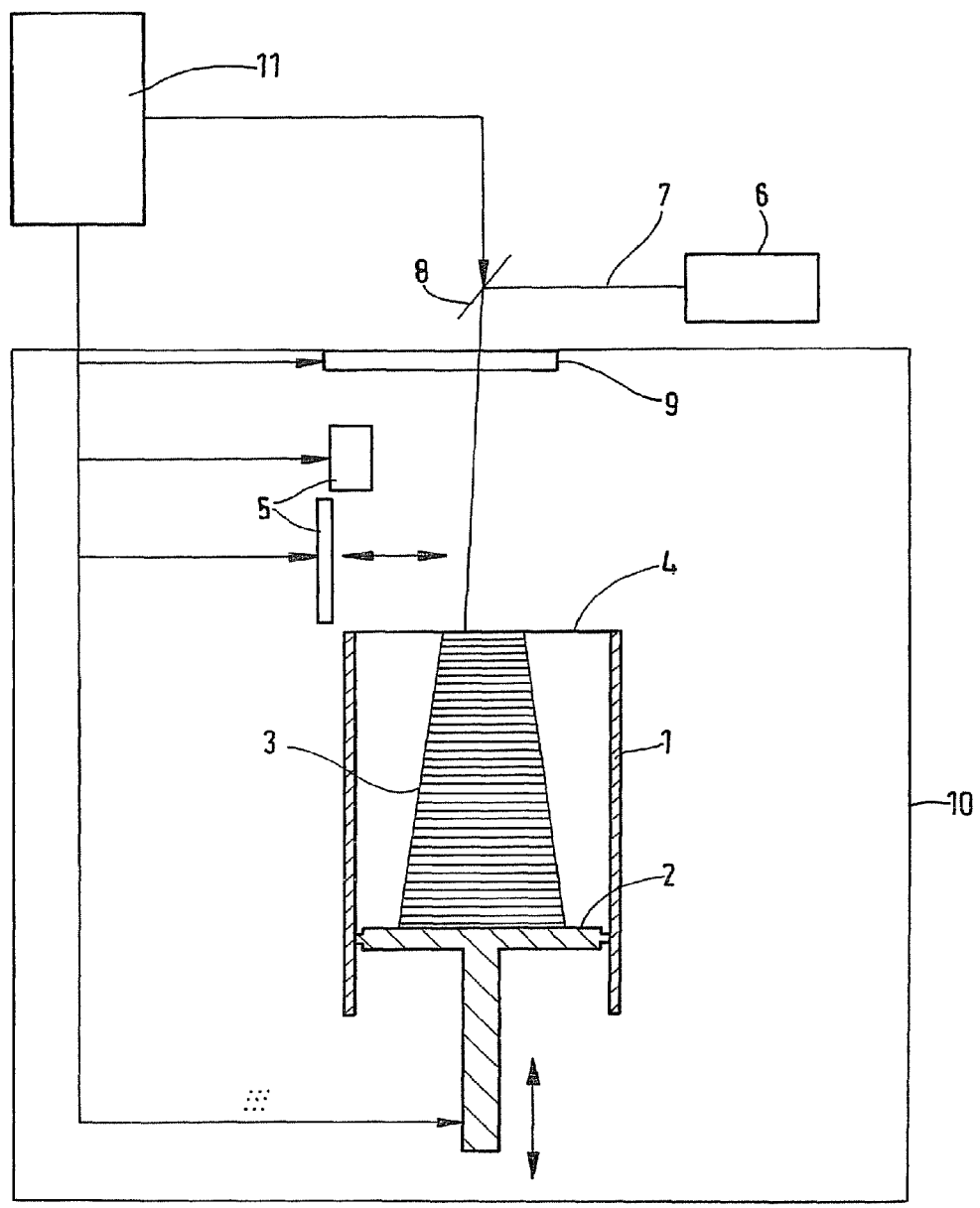
FIG. 1 shows a schematic representation of a laser sintering device.

The laser sintering device shown in FIG. 1 comprises a container 1, which is open to the top and has therein a support 2 that can be moved in a vertical direction, supports the object 3 to be formed and defines a building field. The support 2 is adjusted in the vertical direction such that the respective layer of the object, which layer is to be solidified, lies in a work plane 4. Further, an application device 5 for applying the building material in powder form, which is to be solidified by means of electromagnetic radiation, is provided. The device comprises also a laser 6. The laser beam 7 that has been generated by the laser 6 is directed onto a coupling window 9 by means of a deflection device 8, which lets the laser beam 7 pass into the process chamber 10 and focuses it to a predetermined point in the work plane 4.

Furthermore, a control unit 11 is provided through which the components of the device are controlled in a coordinated manner in order to perform the building process.

Figure 2:
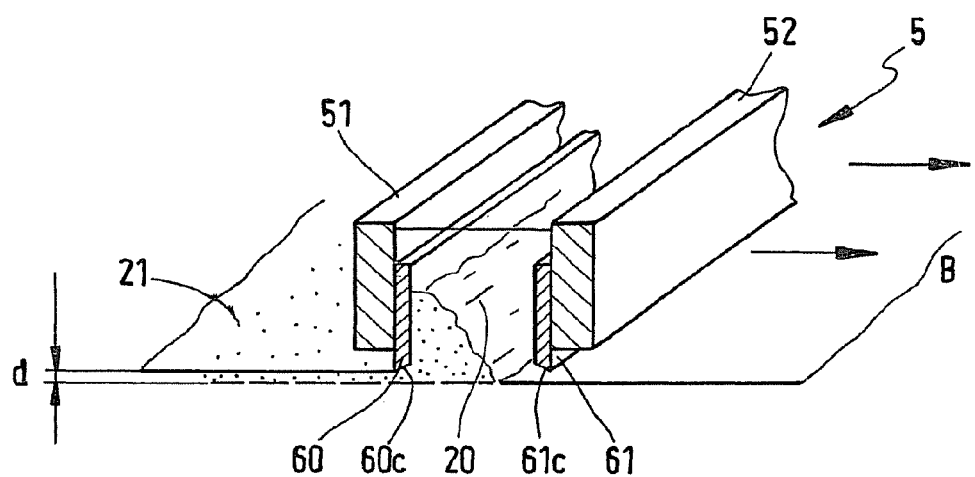
FIG. 2 shows a schematic perspective side view of the powder application by means of an application device in the laser sintering device.

As is shown in FIG. 2, the application device comprises two jaws 51, 52 that are arranged at a distance to each other and at a distance above the work plane, wherein the powder supply 20 is located between these two jaws 51, 52. The jaws 51, 52 extend across the whole width of the building field. On the inner sides of the jaws, which are facing each other, blades 60, 61 are provided, which also extend across the whole width of the building field and which protrude at the jaw downwards towards the work plane. The bottom side of the blade has a distance d from the support surface or the layer that was solidified last, wherein the distance d corresponds to the layer thickness of the desired layer. In FIG. 2 the present direction of movement of the application device 5, which is shown, is indicated by B.

Figure 3:
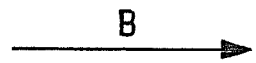
FIG. 3 shows a schematic representation of the cross-section of the application blade of the application device.
Figure 3:
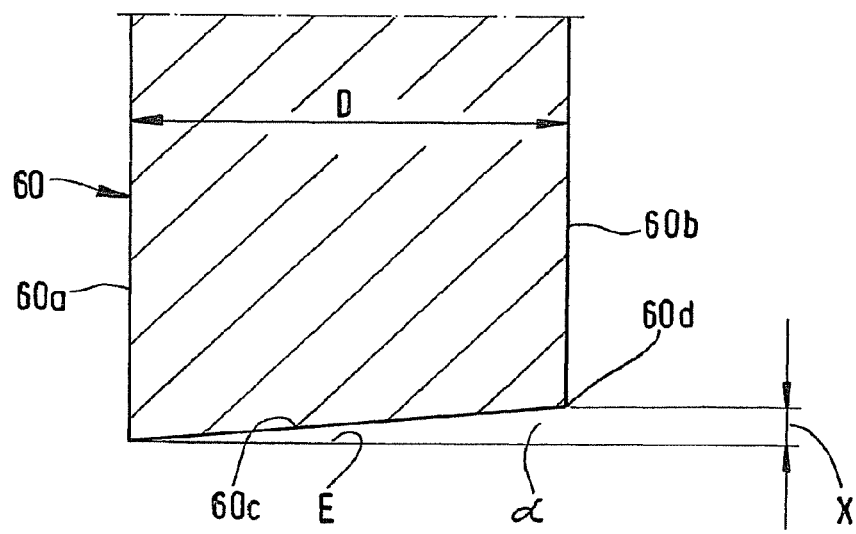

As can be seen in FIG. 3, the blade has a thickness D in the direction of movement B and has two surfaces 60a, 60b that are extending substantially perpendicular to the work plane 4 and are aligned substantially in parallel to each other, which extend transversely across the building field. At its bottom side facing the work plane the blade has a sloping surface 60c, wherein the blade is positioned in the application device such that the sloping surface 60c ascends in the directions of application B. The sloping surface forms an application surface. Together with a surface E that is in parallel to the work plane 4 and the support surface, respectively, it includes an acute angle a, which lies between a value larger than 0° and approximately 5°, preferably at approximately 2° and more preferably larger than about 1.43° and smaller than about 2.86°. The lower edge 60d between the perpendicular surface 60b and the sloping blade surface 60c is at a height x with respect to the plane E. When the blade has a thickness D of approximately 6 mm, the height x is larger than 0.03 and smaller than approximately 0.5 mm, and preferably larger than 0.08 mm and smaller than 5 mm. The thickness of the blade can be between 1 mm and 20 mm. Thereby the application device has only a small angle of incidence of the surface 60c in the application direction B.

The second application blade 61 is arranged at the inner side of the second jaw 52 and is formed such that it is mirror-symmetrical to the first application blade 60. Thus, the beveled surface 61c of the second application blade 61 has an angle of incidence opposite to the application direction B, in which the first application blade 60 performs the application operation. Thereby it is possible to apply a new powder layer by means of the application device during the forward movement and the backward movement, respectively, and to respectively take along the powder supply and if necessary supplement it.

In operation preferably a plastic powder, for example a polymer powder such as polyamide, in particular polyamide 12, or a powder from another family such as PEEK, in each case with or without additions, is used as powder. Before the application operation old powder, which remains as not sintered powder from one or several previous building processes, is mixed with new powder. For example, for unfilled polyamide the refresh rate is 50%-30% of new powder (refresh rate 50/50 to 30/70) and for filled polyamide the refresh rate is 100%-70% of new powder (refresh rate (100/0 to 70/30). The term "new powder" describes a powder that has not been used in any previous manufacturing step. The term "old powder" describes a powder consisting of approximately 90% powder, which is co-inserted into the powder cake and is stored under a high temperature for the whole duration of the building process, and approximately 10% powder, which has been shifted into overflow containers during the layer application.

The mixing can take place outside or inside the laser sintering device. Before each application operation the powder is added in the application device 5 in an amount that is sufficient for applying a layer of the powder.

Then the application device 5 moves across the building field, wherein the application blade 60 applies a layer 21 having the predetermined thickness d. As the surface 60c is sloped with respect to the direction of application B, a force acts onto the powder to be spread, which powder is positioned in the powder column located in front of the application blade 60, wherein the force is directed into the work plane. Thereby the powder 20 is compressed during the application of the layer.

Then the cross-section of the object 3 in the respective laser is irradiated with the laser beam and thus the powder is solidified. Afterwards the application device 5 is again filled with powder and is moved in a direction opposite to the direction B shown in FIGS. 2 and 3. Thereby the second application blade 61, which is formed mirror-symmetrically to the first application blade 60, acts as application device and applies a new powder layer onto the last solidified layer and the powder surrounding the solidified region, respectively.

Figure 4:
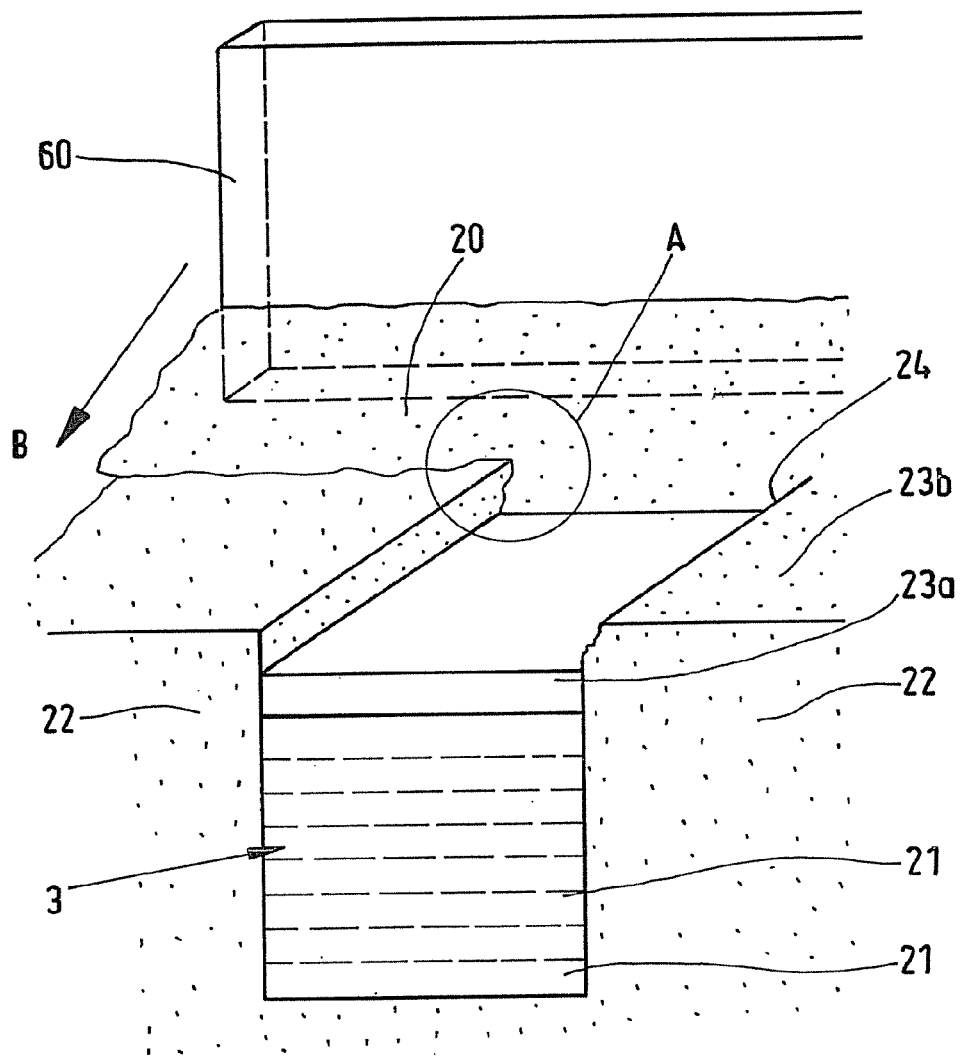
FIG. 4 shows a schematic partial cross-sectional perspective view of how the application device applies powder onto an already sintered layer.

FIG. 4 explains schematically the operation of the blade according to the invention. The object 3 comprises a plurality of already solidified layers 21 and not sintered powder 22 surrounding these layers. The last applied and solidified layer comprises an already solidified portion 23a and not sintered powder 23b. As the density increases during the solidification, the already solidified region 23a is slightly lowered with respect to the level of the unsolidified powder 23b. Thereby edges 24 are formed between the already solidified portion 23a and the unsolidified region 23b.

When the blade 60 according to the invention is used, it was observed with surprise that a compression pressure acts on the particles in the layer and there are marginal or no dip positions in the completed part.

By increasing the powder bed density it is not only possible to reduce the refresh rate, but also to use a powder, which up to now is not or only to a limited extent suited for the laser sintering process.

The powder bed density is measured as follows: A closed hollow thin-walled block-shaped laser sintering part is exposed such that the enclosed volume during the exposure has a value 100 mm×10 mm×15 mm in the directions xyz. The volume surrounding the part has to be dimensioned correspondingly. Adhering powder remnants are removed from the outside of the thus manufactured part and the thus manufactured part is weighed. Thereafter the part is cut open and the powder inside is drained and the empty part is again weighed. The difference between the masses corresponds to the mass of the enclosed powder volume. As the powder volume is known, the density of the powder bed can be calculated from it.

The following table shows a result of the device according to the invention and of the method compared to the prior art. Polyamide 12, which can be obtained under the trade name PA 2200 (sintering powder of the applicant for the EOSINT P machine) was used as laser sintering powder. The applied layer thickness was 0.15 mm:

| Aging condition of the powder % new powder/% old powder | Solution viscosity according to ISO 307 [η rel] | Minimum powder bed density [g/cm$^3$] | Blade geometry [width (mm)/compressed density (mm) Results for single bevel |
|---|---|---|---|
| 50/50 | 2.1 | 0.4 | 6/0.08 |
| 25/75 | 2.35 | 0.41 | 6/0.15 |
| 0/100 | 2.6 | 0.43 | 6/0.3 |

The solution viscosity of the powder was determined according to ISO 307, the powder bed density was determined according to the above-described method.

By the method and the device, respectively, the required proportion of new powder can be reduced. In an exceptional case it is even possible to work with nearly 100% of old powder. Furthermore, the table shows that the solution viscosity, which is a measure for the melt viscosity of the material, increases with the proportion of old powder. Therefore, by the method according to the invention it is also possible to sinter also powder materials that have a correspondingly high melt viscosity and could not be processed by the methods and devices existing hitherto. Polyamide (PA), in particular PA 12, is advantageously suited for the device and the method, because it can be manufactured by a precipitation process and therefore has a particularly smooth surface compared to a milled powder. Therefore, settling processes can advantageously take place during the application.

The geometry of the application device is not limited to the specifically shown embodiment. For instance, the surfaces 60a, 60b need not be in parallel and shaped surfaces are also not excluded.

The ascending slope of the application surface need not be constant, but may also ascend in a different way, e.g. may be scaled or may have a different shape.

Instead of a laser also a different energy source as the solidification device, which is suited for the solidification of a material in power form such as an electron beam source can be used. Also other ways of an energy entry are possible such as mask sintering, inhibition sintering or a line-shaped energy entry or an energy entry via an array.

The invention claimed is:

1. Device for manufacturing a three-dimensional object by a subsequent solidification of layers of a building material in powder form at those positions in the respective layers corresponding to the cross-section of the object by the action of a laser or another energy source having
    a support, on which the object is built,
    an application device for applying layers of a powder material onto the support or a previously solidified layer in a work plane, wherein the application device is movable in at least one application direction across the support or the previously solidified layer,
    a solidification device for solidifying the powder material at those positions in the respective layer that correspond to the object,
    the application device further comprises a blade
    the blade having two surfaces that are extending substantially perpendicular to the work plane and are aligned substantially in parallel to each other,
    the blade further having a planar application surface that rises in the direction of the application, wherein the application surface is provided at the bottom side of the blade facing the support, and
    the planar application surface rises at an angle, which is larger than 1.43° and smaller than 2.86° in the direction of movement of the application device.

2. Device according to claim 1, characterized in that the width of the application surface in the direction of movement lies between 1 mm and 20 mm.

3. Device according to claim 1, characterized in that the height of the application surface is larger than 0.03 mm and smaller than 0.5 mm.

4. Device according to claim 1, characterized in that the application device has two blades that are arranged at a distance to each other and are formed mirror-symmetrically to a plane that is perpendicular to the direction of movement of the application device.

5. Device according to claim 1, characterized in that the blade is formed symmetrically and has two application surfaces.

6. Device according to claim 1, characterized in that the width of the application surface in the direction of movement lies at 6 mm.

7. Device according to claim 1, characterized in that the height of the application surface is larger than 0.08 mm and smaller than 5 mm.

* * * * *

UNITED STATES PATENT AND TRADEMARK OFFICE
CERTIFICATE OF CORRECTION

PATENT NO. : 8,967,990 B2
APPLICATION NO. : 14/150993
DATED : March 3, 2015
INVENTOR(S) : Weidinger et al.

Page 1 of 1

It is certified that error appears in the above-identified patent and that said Letters Patent is hereby corrected as shown below:

Title page, item (71) delete the following:

"(71) Applicant: EOS GmbH Electro Optical Systems, (Krailing, DE)"

And replace with:

(71) Applicant: EOS GmbH Electro Optical Systems, (Krailling, DE)

Signed and Sealed this
Twenty-ninth Day of December, 2015

Michelle K. Lee
*Director of the United States Patent and Trademark Office*